May 28, 1963  W. M. GOODWIN  3,091,498
SIDE DUMPING TRAILER
Filed May 21, 1962  2 Sheets-Sheet 1
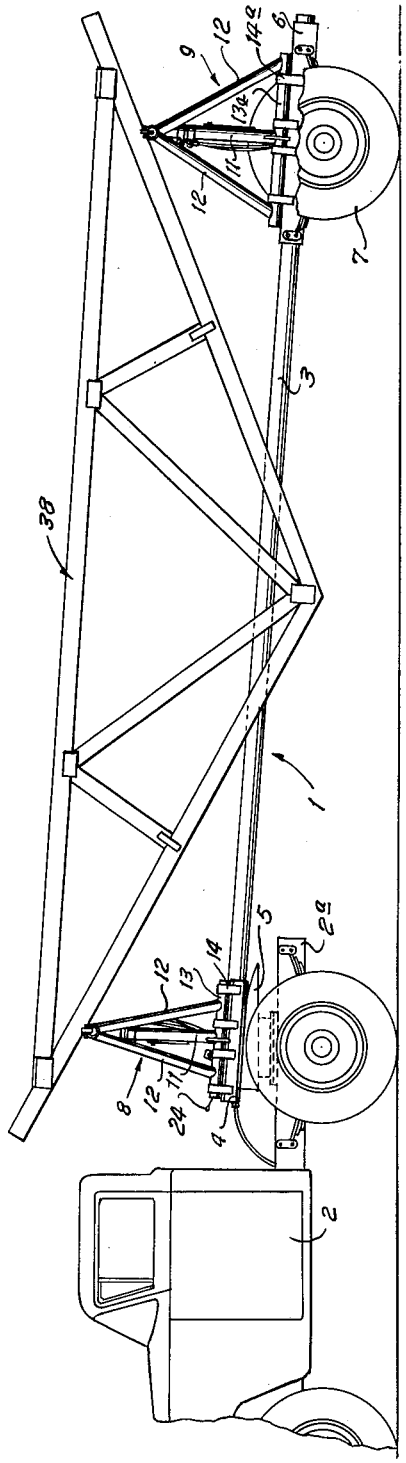
Fig. I
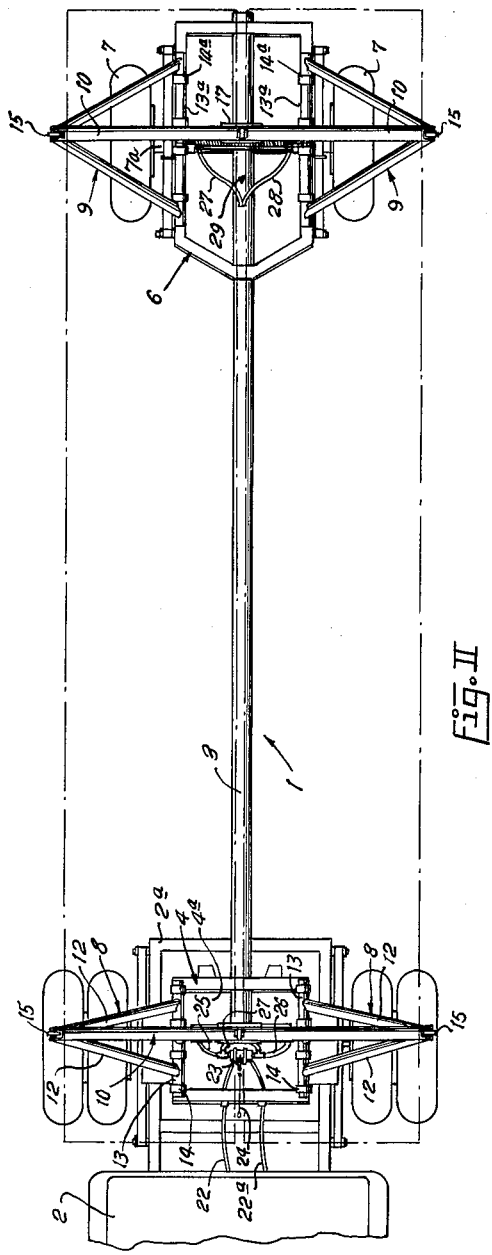
Fig. II
INVENTOR.
Wayne M. Goodwin
BY Howard E. Moore
ATTORNEY May 28, 1963  W. M. GOODWIN  3,091,498
SIDE DUMPING TRAILER
Filed May 21, 1962  2 Sheets-Sheet 2
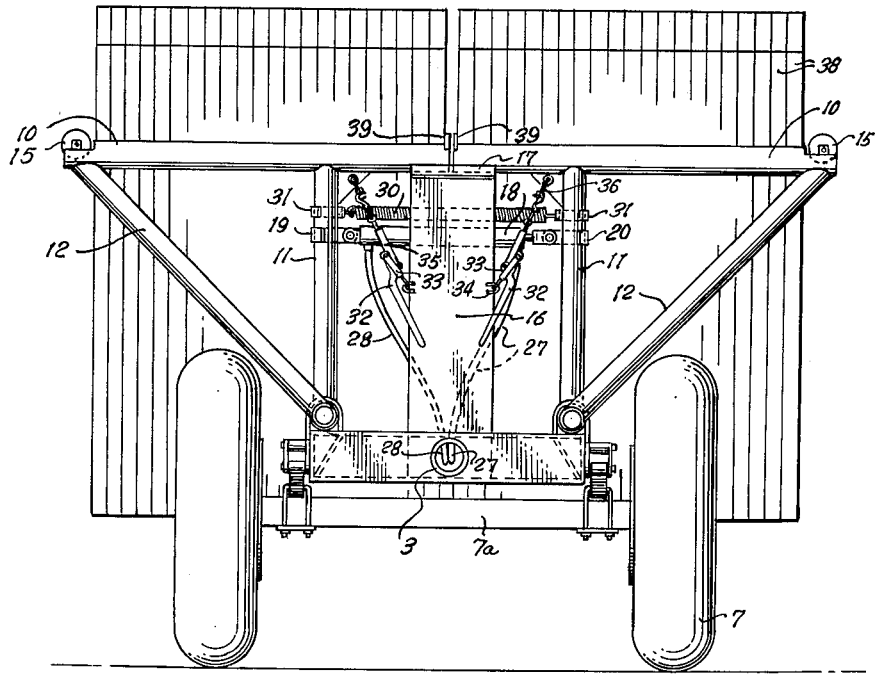
Fig. III
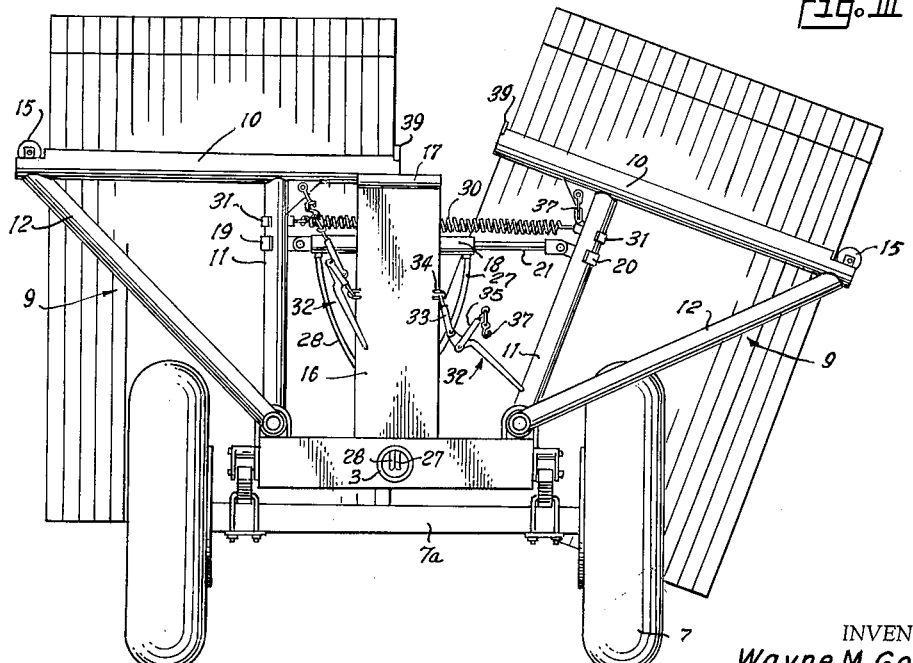
Fig. IV
INVENTOR.
Wayne M. Goodwin
BY Howard E. Moore
ATTORNEY United States Patent Office 3,091,498
Patented May 28, 1963

3,091,498
SIDE DUMPING TRAILER
Wayne M. Goodwin, Dallas, Tex., assignor to Barns Lumber and Manufacturing Company, Dallas, Tex., a corporation of Texas
Filed May 21, 1962, Ser. No. 196,076
4 Claims. (Cl. 298—8)

This invention is concerned with a trailer apparatus arranged to be towed behind a truck, and is particularly concerned with a trailer device, having frame supporting members, which are pivotally mounted with relation to the trailer frame, so that they can be pivoted outwardly and downwardly, either individually or collectively, to deposit a load carried thereon.

The trailer apparatus hereinafter described is particularly designed for hauling roof frame members, or the like, which have portions extending downwardly below the trailer frame, and to provide means on the trailer frame for gently depositing the roof frames carried thereon, and at the same time haul a maximum number of such roof frames in a single load. However, it will be understood that the device and mechanism herein described could be employed to transport and load other articles than roof frames, which would be adaptable for disposition on the pivoted load carrying frames, hereinafter described.

It is, therefore, a primary object of the invention to provide a trailer construction for carrying and hauling roof frames, or the like, which will transport the maximum number of such frames in a single load, and which provides means thereon for easily and quickly unloading the load therefrom, with least chance of damaging the transported articles, and with a minimum amount of labor.

A still further object of the invention is to provide in a trailer apparatus load supporting frames at each end thereof which are arranged to be tilted sidewardly of the trailer, either individually or collectively, to deposit a load therefrom.

A further object of the invention is to provide in a trailer frame a longitudinal support member extending medially thereof which is of minimum width, and includes load supporting frame members at each end thereof presenting parallel, horizontal surfaces above the frame, so that articles of considerable depth can be carried on the horizontally disposed elements with portions thereof extending below the medial frame member, whereby a maximum number of such articles can be carried in a single load.

Another object of the invention is to provide hydraulically actuated side tilting load supporting frame members at each end of an elongated trailer device, which are operated by a common hydraulic control, and wherein the sidewardly tilting load support members may be actuated either individually or collectively by the single control, and wherein spring means is provided for returning the sidewardly tiltable members to upright position after the hydraulic means is deactivated.

A still further object of the invention is to provide a trailer construction of the type hereinbefore indicated which is simple and economical to manufacture, assemble, and operate, and wherein a load may be loaded thereon and unloaded therefrom with a minimum of labor and effort, with least danger of damaging the transported article.

Other and further objects of the invention will become apparent upon reading the detailed specifications hereinafter following, and by referring to the drawings annexed hereto.

A suitable embodiment of the invention is shown in the attached drawings, wherein:

FIGURE I is a side elevational view of the trailer device;

FIGURE II is a top plan view thereof;

FIGURE III is a rear end view of the trailer device, showing the load support members in upright position with a load suspended thereon; and FIGURE IV is a rear elevational view thereof, showing the pivoted load support members at one side of the trailer pivoted sideward in the process of depositing a load therefrom.

Numeral references are employed to indicate the various parts shown in the drawings, and like numerals indicate like parts throughout the various figures of the drawings.

In the drawing the numeral 1 generally indicates the overall trailer frame, which is attached to, and towed by, a conventional truck 2, having a rearwardly extending frame 2a thereon.

The trailer 1 includes an elongate tubular main support member 3 extending medially thereof, to the front end of which is secured a front end frame member 4, including a base plate 4a, which is detachably secured to a conventional fifth wheel 5 on the truck frame 2a.

A rear end frame member 6 is secured to the back end of the medial tubular frame support 3, which includes a generally rectangular frame supporting an axle 7a on which the wheels 7 are rotatably attached.

The load support members 8, attached to the front end frame member 4, and the load support members 9 attached to the rear end frame member 6, are identical in construction and function, and the description of one will suffice for the description of all.

The load support members 8 and 9 each includes a horizontal portion 10, and a vertical portion 11, and angularly disposed members 12. The lower ends of the vertical portions 11 and angular members 12 are secured to horizontally disposed pivot shafts 13 and 13a which are rotatably disposed in pivot loops 14 and 14a, secured to the front frame member 4 and rear frame member 6, respectively.

Thus it will be seen that the support members 8 and 9, disposed at the front and rear of the trailer device, are arranged to be pivoted sidewardly as the pivot shafts 13 and 13a rotate in the loops 14 and 14a.

Each of the support members 8 and 9 has a roller 15 rotatably attached at the outer end of the horizontal portions 10 thereof to facilitate the deposit of the load therefrom in the manner hereinafter described.

An upright standard 16 (FIGS. III and IV) is secured to each frame member 4 and 6, and each has a cradle 17 on the upper end thereof presenting an upwardly facing concave face, to receive and support the inner ends of the horizontal tubular members 10 in an upright position, as shown in FIGURE III. It will be seen that when the pivoted support members 8 and 9 are in upright position, as shown in FIGURE III, the horizontal members 10 present aligned, parallel horizontal surfaces at each end of the trailer, which are spaced above the central tubular frame 3, so that articles to be transported, such as a triangular shaped roof frame 38, may be deposited thereon in position, so that the downwardly extending apex portions thereof may extend downwardly on each side of the central tubular frame support 3 for transportation.

However, the pivoted support members 8 and 9 may be pivoted downwardly to deposit the roof frame members, or other articles being hauled, upon the ground as they slide over the rollers 15 in so being deposited.

A hydraulic ram 18 is attached between the upright members 11 of the pivoted support frames 8 and 9, at each end of the trailer device. The said hydraulic rams 18 are attached to the upright members 11 by means of brackets 19 and 20, which have clips on the ends thereof embracing the members 11. The bracket 19 is pivotally attached to the cylinder of the hydraulic ram 18, and the bracket 20 is pivotally attached to the rod 21, which is slidably disposed in the cylinder of hydraulic ram 18. Hydraulic fluid under pressure is supplied to the hydraulic rams 18 for actuation thereof through supply and return hoses 22 and 22a which communicate with a hydraulic pump on the truck. Compressed air could also be used to actuate rams 18. The hoses 22 and 22a are connected to a control valve 23 which is opened and closed by means of a suitable control rod 24 attached to the valve control lever.

Hydraulic lines 25 and 26 extend from the control valve 23 to the ram 18 associated with the pivoted frames 8 and 9 mounted on the front frame member 4. The hydraulic lines 25 and 26 extend to opposite sides of the piston in the hydraulic ram 18. The hydraulic rams 18 are single acting rams so that when hydraulic pressure is exerted behind the piston therein, the piston rod 21 will be extended with relation to the cylinder of ram 18, as shown in FIGURE IV.

Hydraulic lines 27 and 28 branch off from the hydraulic lines 25 and 26, and pass through the tubular frame portion 3 and outwardly through the relieved portion 29 at the rear end thereof, and communicate with opposite ends of the cylinder of hydraulic ram 18, as shown in FIGURE IV.

Thus it will be seen that when the valve 23 is opened by pulling on the control arm 24, fluid under pressure is supplied to corresponding ends of the cylinder of the hydraulic ram 18 so that the piston rods 21 in the rams 18 at each end of the trailer device, are extended in unison, and unless restrained in the manner hereinafter described, the load support members 8 and 9 at each end of the trailer would be pivoted outwardly by a relative extensible movement between the cylinders 18 and the rods 21.

A spring 30 is attached between the pivoted load support frames 8 and 9 at each end of the trailer device, said springs being secured to the upright members 11 by brackets 31 embracing same. As shown in FIGURE IV, when the hydraulic rams 18 are actuated, to move the pivoted frame members 8 and 9 outwardly, the spring therebetween is extended, and when hydraulic pressure is relieved by releasing the control 24 of valve 23, the spring 30 retracts, to move the pivoted frame members 9 and 10 back to normal, upright position, as shown in FIGURE III.

The pivoted support frames 8 and 9 are normally held in upright position by means of the take-up links, commonly called "boomers," indicated generally at 32, each of which includes a pivoted link 33 hooked to an eye 34 secured to the standard 16, and a pivoted link 35 hooked to a pivoted eye 36 secured to the frame of the pivoted load support members 8 and 9, at each end of the trailer frame.

Thus by disengaging one or more of the links 35, from the frames 8 and 9, the said frames may be selectively tilted sideward. By disconnecting the take-up links from the frames 8 and 9 on one side of the trailer frame, the load support frames 8 and 9 can be tilted downwardly and outwardly by simultaneous actuation of the rams 18, while the load support frames 8 and 9 on the other side of the trailer frame will be held in upright position by the boomers 32 connected between the standard 16 and the pivoted load support members 8 and 9.

The operation and function of the device hereinbefore described is as follows:

The roof frame members 38, which would normally be held together in groups by means of metal straps or otherwise, as shown in FIGURES III and IV, may be loaded on the trailer frame, by the use of a fork lift truck or hoist, which will hoist the packages of frame members and deposit same on the supporting frames 8 and 9, to the position shown in FIGURE I. It will be noted that the apexes of the triangular shaped frame members extend below the tubular central frame member 3, and that the bundles of roof frame members 38 are balanced on opposite sides of the central tubular member 3. The bundles of roof frame members 38 are held against endwise movement on the horizontal portions 10 of the frame members 8 and 9, by means of the upright tabs 39 at the inner ends thereof, and by the rollers 15 at the outer ends thereof.

When it is desired to unload the roof frames at a place where hoisting or fork lift equipment may not be available, same may be done by disconnecting the take-up link 32 from the support members 8 and 9, actuating the control valve 23 in the manner hereinbefore described, causing the cylinders of the hydraulic rams 18 and the piston rods 21 thereof to extend relative to each other, thereby pushing the pivoted frame members 8 and 9 outwardly in a gentle motion, causing the bundles of roof frame members 38, to be deposited on their sides gently without damage. After the frame members 38 have been so deposited, the hydraulic pressure line is closed by closing the valve 23, and the springs 30 will retract, raising the pivoted frame members 8 and 9 upwardly to normal position, as shown in FIGURE III.

As hereinbefore explained, one or more of the pivoted support members 8 or 9 may be retained in upward position when the hydraulic ram 18 is actuated, by simply failing to disconnect the take-up device or boomers 32 therefrom. Thus the bundles of roof frames 38 may be deposited individually and at different places.

As will be observed in FIGURE I, the bundle of roof frames 38 are triangular in shape, being in the shape of an isosceles triangle, and when loaded on the trailer frame the base of the triangle is turned upwardly, the legs thereof are resting on the horizontal supports 10, and the apex of the triangle extends below the tubular frame member 3. This permits the greatest possible number of such roof frame members 38 to be hauled on a given load, and they may be loaded with ease and unloaded with ease, without danger of damage thereto.

There has been provided a load supporting trailer device for the purposes herein described, which is simple in construction and operation and is minimum in weight. The upright support members 8 and 9 may be made of tubular stock welded together, and the central frame member 3 is also made of tubular stock of standard dimensions.

Having described my invention, I claim:

1. In a trailer device,
an elongated central frame member,
a front frame member attached to the central frame member;
a rear frame member attached to the central frame member;
a pair of load supporting members pivotally attached to the front and rear frame members,
arranged to pivot outwardly thereof;
each such support member including a horizontal member,
a vertical member,
angularly extending members secured to the horizontal member,
and a longitudinal member rotatably attached to the frame member to which the lower end of the vertical member and the angularly disposed members are secured;
pressure actuated expansion means attached between the vertical members of each front and rear pair of pivoted load supporting members;
and spring means attached between said vertical members,
arranged to return the load supporting members to upright position after being pivoted outwardly by the expansion means.

2. The combination called for in claim 1 with the addition of a vertical standard extending upwardly from each of the front and rear frame members;

and a cradle on the upper end of each standard, arranged to receive the horizontal members of the load support members.

3. The combination called for in claim 1 with the addition of upwardly extending rollers on the outer ends of each of the horizontal portions of the load support members.

4. The combination called for in claim 1 wherein the expansion means are fluid pressure actuated, a common control controls the actuation of the expansion means;

the central frame member is tubular;

and pressure fluid transfer lines extend from said common control through the central tubular member to the expansion means at the rear of the trailer device.

References Cited in the file of this patent

UNITED STATES PATENTS

| | | |
|---|---|---|
| 368,847 | Nearing | Aug. 23, 1887 |
| 2,161,734 | Wheless | June 6, 1939 |
| 2,739,836 | Kilpatrick | Mar. 27, 1956 |
| 2,745,562 | Vandemark et al | May 15, 1956 |
| 2,981,425 | Hughes | Apr. 25, 1961 |

FOREIGN PATENTS

| | | |
|---|---|---|
| 1,184,693 | France | Feb. 9, 1959 |